Dec. 29, 1970     T. C. BOWEN     3,550,328

HELICAL GEAR GRINDER MACHINE

Filed Feb. 5, 1968     6 Sheets-Sheet 1

INVENTOR:
THOMAS C. BOWEN
BY
ATTORNEYS

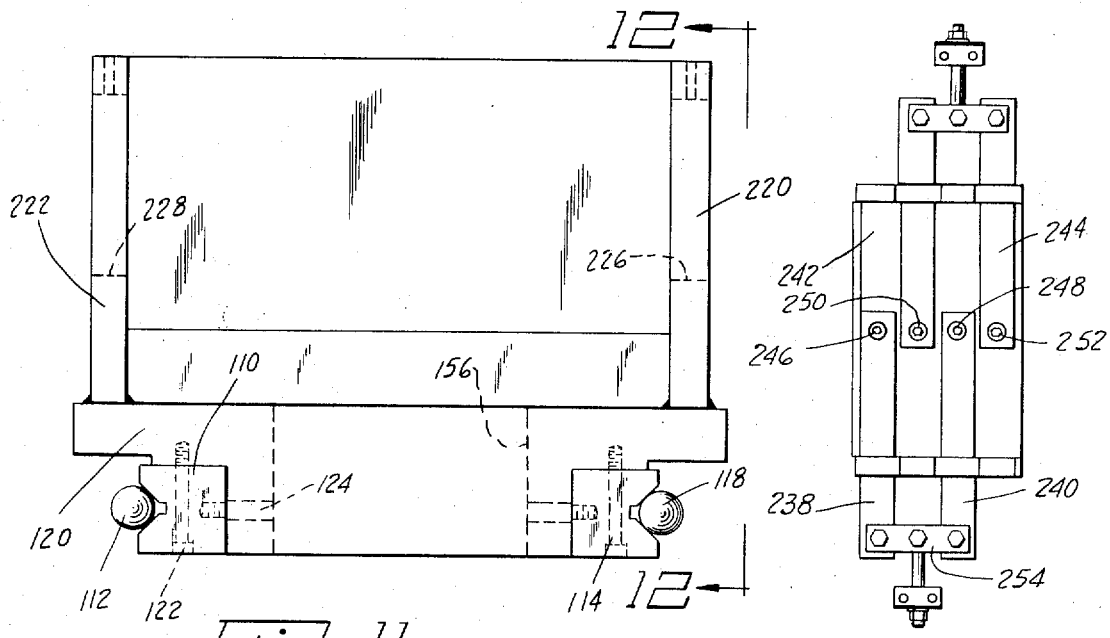
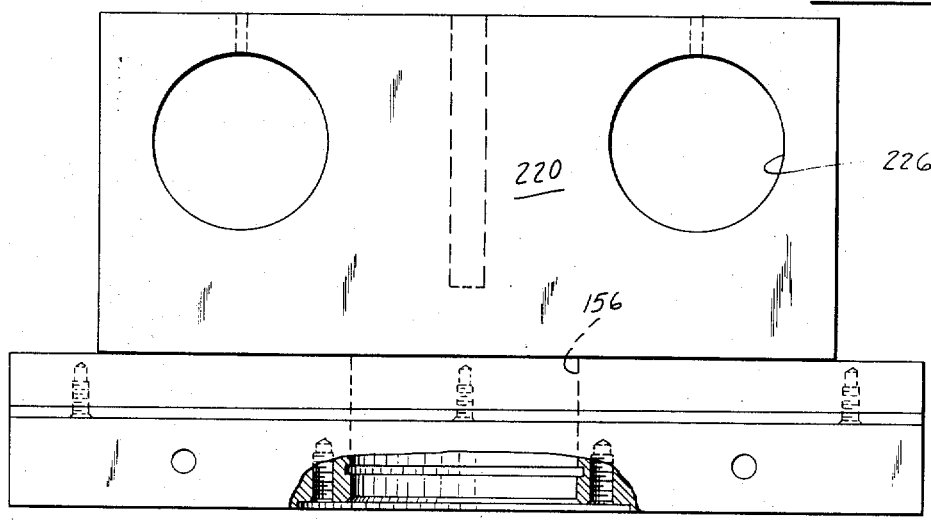
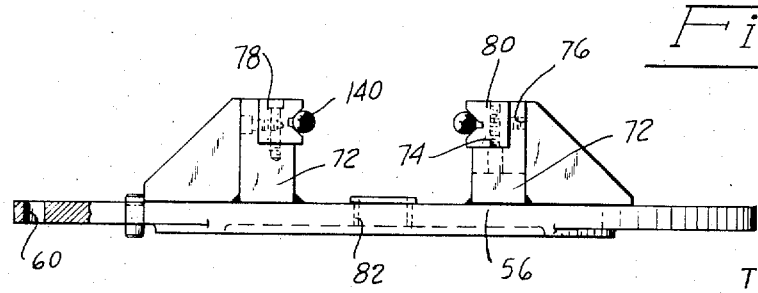

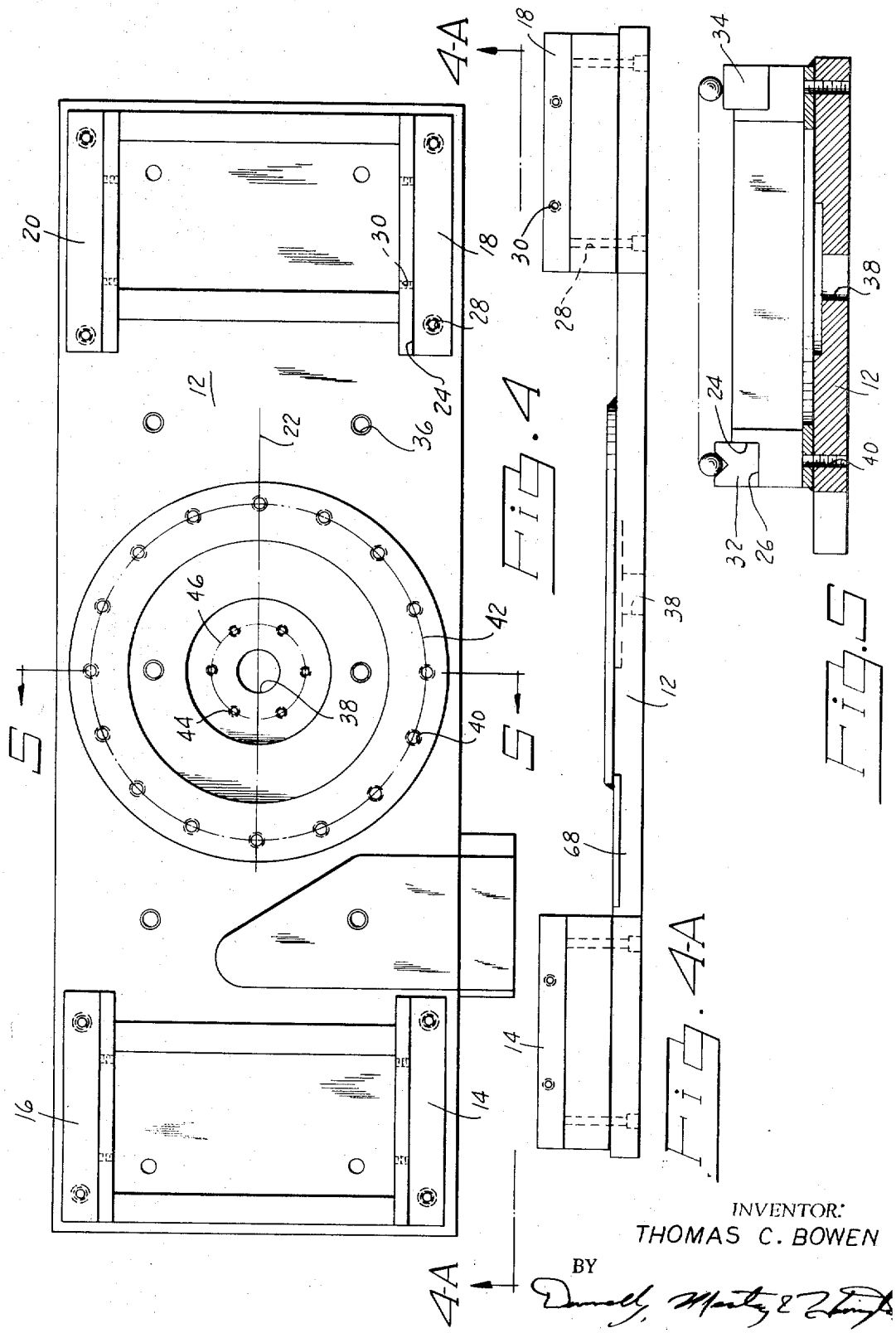

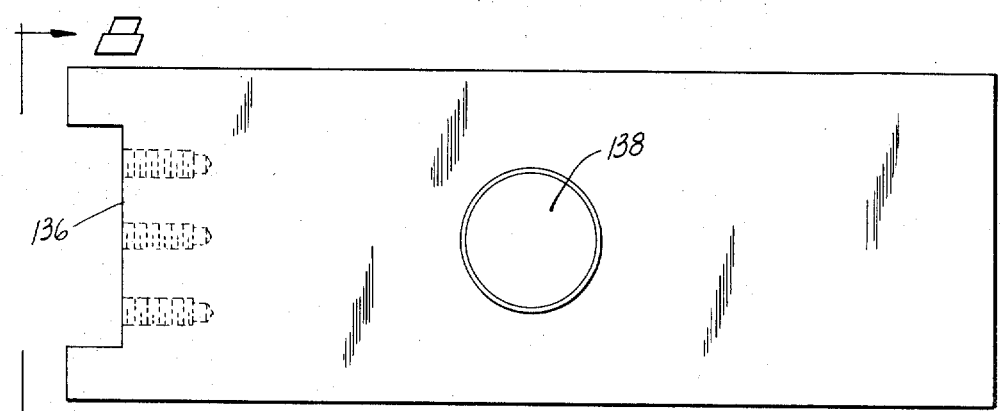
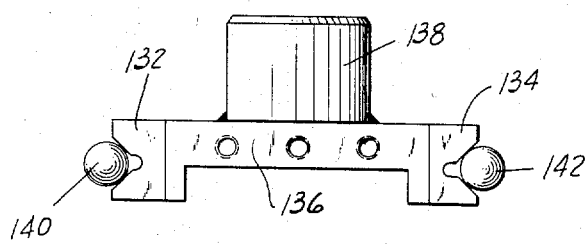
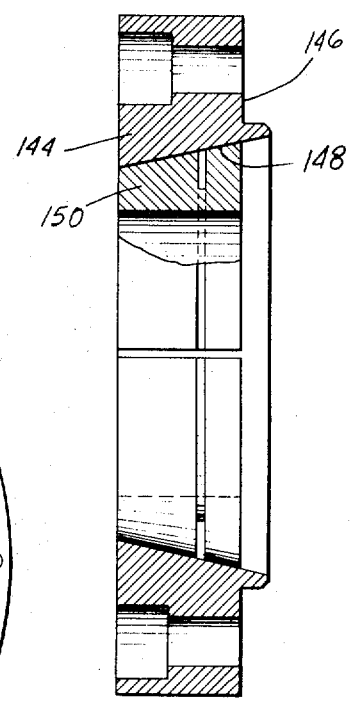
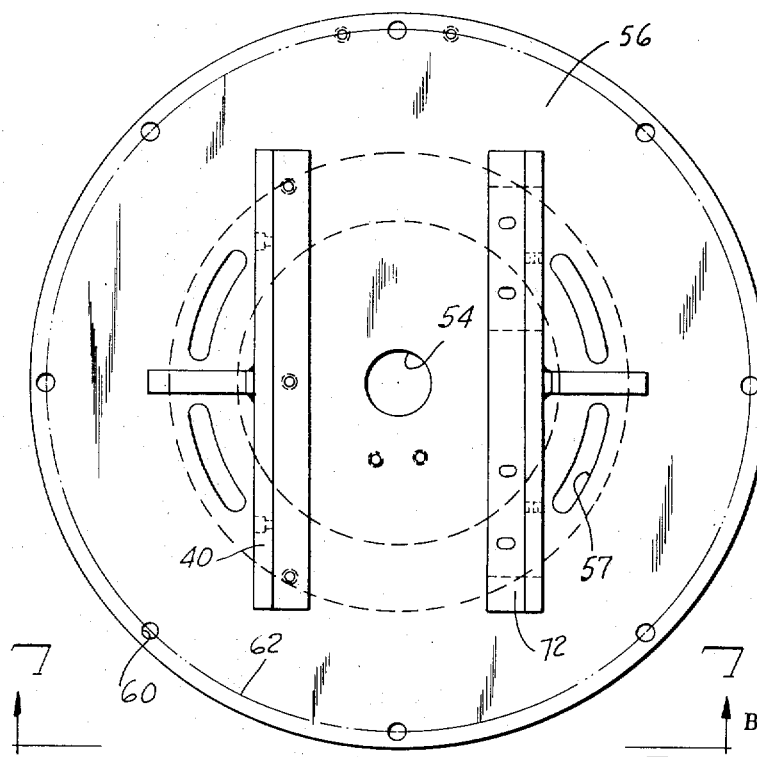

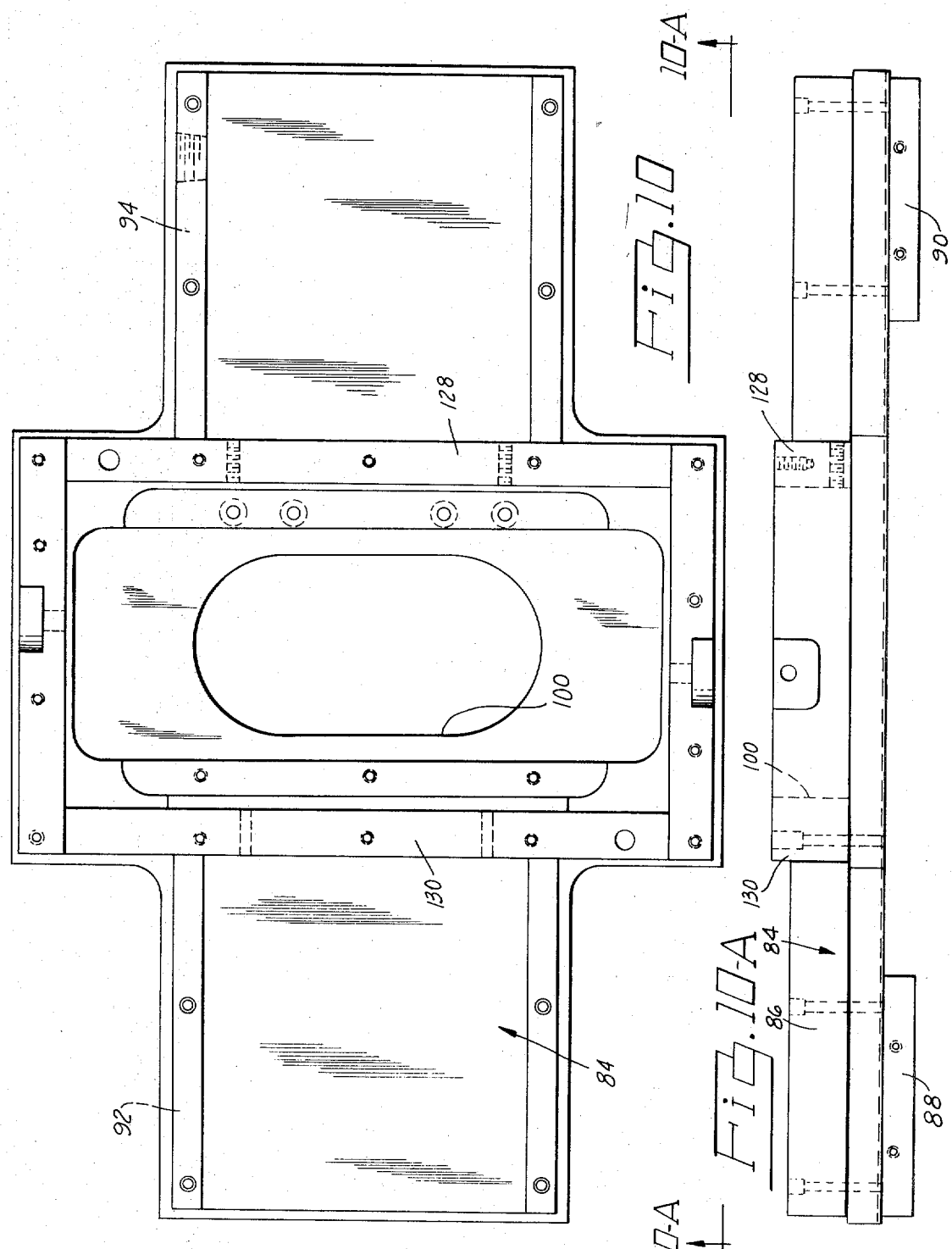

United States Patent Office 3,550,328
Patented Dec. 29, 1970

3,550,328
HELICAL GEAR GRINDER MACHINE
Thomas C. Bowen, Birmingham, Mich., assignor to G. L. Bowen and Co., Oak Park, Mich., a corporation of Michigan
Filed Feb. 5, 1968, Ser. No. 703,016
Int. Cl. B24b 47/02
U.S. Cl. 51—232                                    14 Claims

ABSTRACT OF THE DISCLOSURE

This application describes a gear grinder machine for forming helical gear teeth on a gear blank. The machine includes a fixture adapted to mount and to index either internal or external helical gear blanks during the formation of the gear teeth. It includes also a powered sine bar assembly which is part of a compound slide mechanism capable of advancing the gear tooth blank in the direction of its axis while rotating it about its axis.

GENERAL DESCRIPTION OF THE INVENTION

My invention comprises a helical gear tooth grinding machine having a stationary base structure on which a movable table is supported, a suitable ball and V-groove track assembly being provided to permit adjustment of the table with respect to the base. Motion is imparted to the table by means of a sine bar assembly comprising a sine bar cross slide positioned in a V-groove trackway that in turn is fixed to the base structure. The sine bar cross slide is actuated by a servo motor. A cross slide positioned in another ball and V-groove trackway carried by the table is movable in a transverse direction with respect to the table. The cross slide for the sine bar is connected mechanically to the cross slide for the table by means of a tolerance-free drive pin and bearing assembly. In this way gear teeth with any lead angle between 90° and 0° can be formed in the gear blank.

The transverse motion imparted to the sine bar by the servo motor is translated into rotary motion of a gear blank driving drum, the latter being connected to and supported by the movable table. As the drum is shifted in the direction of translation of the table, it is rotated about its axis and translatory movement of the table cross slide occurs with respect to the table itself. This compound motion of the drum is imparted to a gear blank connected to the drum through a suitable indexing mechanism. The gear blank thus can be fed into and away from a rotary gear grinding wheel having a pre-shaped grinding periphery.

The helix angle that is developed, which may be as great as 90°, is determined by the sine bar setting. The sine bar can be controlled by the operator and fixed in a definite position for any gear grinding operation.

After each individual gear tooth grinding step the gear blank is indexed by appropriately positioning the drum at any one of several angular positions with respect to its rotary axis.

Motion is imparted to the sine bar slide by a single servo motor. This motion is translated by the compound slide assembly and the rotary drum assembly into a compound motion for the ear blank.

The improved gear grinding machine of my invention is capable of grinding the gear teeth on both passes of the grinding wheel as the blank is fed into and retracted from the grinding wheel. This is made possible because of a zero-backlash condition in the grinding machine.

The improved accuracy that is achieved due to this zero tolerance relationship of the moving elements of my grinding machine makes it possible to form helical gear teeth with zero lead error. Such precision has not heretofore been possible with prior art machines.

An important characteristic of my invention resides in the concept of powering the sine bar assembly so that it acts as a driver for the machine rather than as a driven element. This makes it possible for the lead angle for the finished part gear to be as low as zero degrees. In this respect it differs in both structure and in function from prior art machines which are not capable of forming helical gear teeth with lead angles less than about 30°.

BRIEF DESCRIPTION OF THE FIGURES OF THE DRAWINGS

FIG. 3 is a partial plan view as seen from the plane of section line 3—3 of FIG. 1.
FIG. 4 is a plan view of a base portion of the structure of FIG. 1.
FIG. 4a is a side view of the base of FIG. 4.
FIG. 5 is a cross sectional view taken along the plane of section line 5—5 of FIG. 4.
FIG. 6 is a plan view of a sine bar member seen also in FIG. 1.
FIG. 7 is an end view seen from the plane of section line 7—7 of FIG. 6.
FIG. 8 is a detail view of a slide assembly used with the sine bar of FIGS. 6 and 7.
FIG. 9 is a plan view of the slide of FIG. 8.
FIG. 10 is a plan view of a movable table used for adjusting the work-piece supporting structure of the FIG. 1 construction.
FIG. 10a is a side view of the table of FIG. 10.
FIG. 11 is a cross slide which cooperates with the table of FIG. 10.
FIG. 12 is a side elevation view of the structure of FIG. 11, as seen from the plane of section line 12—12 of FIG. 11.
FIG. 13 is an assembly view of a zero-tolerance bearing connection used with the cross slide of FIGS. 11 and 12.

PARTICULAR DESCRIPTION OF THE INVENTION

Figure 1:
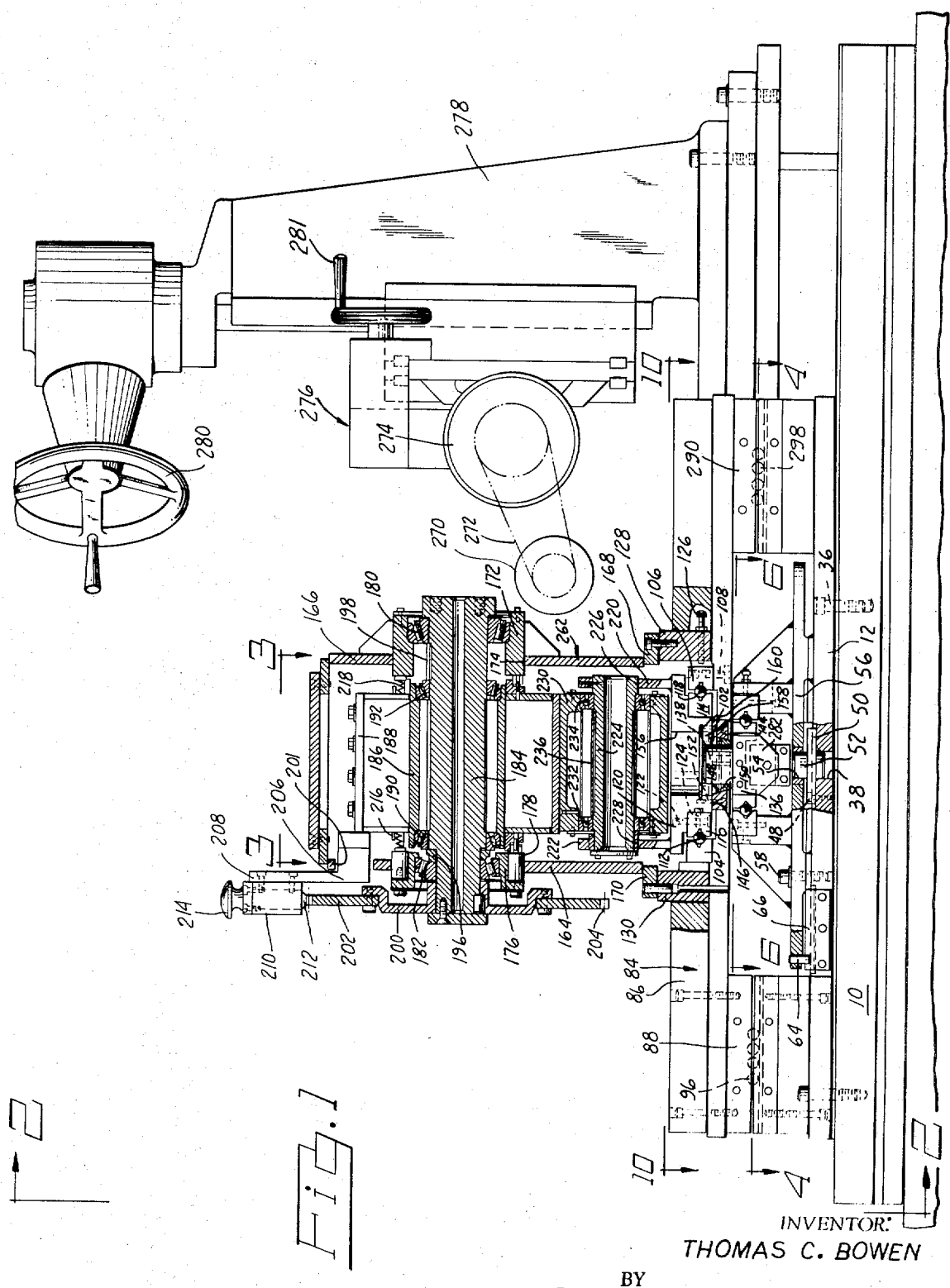
FIG. 1 shows a cross sectional assembly view of my gear grinding fixture.

In FIGS. 1, 4 and 5, numeral 10 designates generally the base for the gear grinder fixture. It includes a horizontal plate 12 and four track supports 14, 16, 18 and 20. Each support is secured to the plate 12 with its axis running parallel to the geometric axis 22 of the plate 12. Each support is identical to the others.

Support 18, which is typical, includes a track locating surface 24 and a cooperating track locating surface 26. The support itself is bolted by bolts 28 to the plate 12. Bolt holes 30 extend through the support and through the locating face 24. A V-groove trackway 32 is secured to the support 18 by suitable bolts received within the openings 30. A flat trackway 34 secured to the support 20 corresponds in position to the V-groove trackway 32.

Bolts 36, preferably four in number, extend through the plate 12 and secure the plate 12 to the base structure 10. The support 16 carries a flat trackway similar to that shown at 34, and the support 14 carries a V-groove trackway similar to that shown at 32.

The center of the plate 12 has a guide pin opening 38. A series of clamping bolt holes 40 is formed in the plate 12 on a bolt circle 42 surrounding the opening 38. A second set of clamping bolt holes 44 located on a bolt circle 46 surrounds the opening 38 within the circle 42. Openings 44 receive clamping bolts 48 extending through flange 50 on guide pin 52, the lower end of which extends through the opening 38 as best seen in FIG. 1.

The upper end of the gudie pin 52 extends through sine bar pilot pin opening 54, which is formed in the base plate 56 of the sine bar shown in FIGS. 6 and 7. Plate 56 includes a series of arcuate slots 57 for receiving clamping bolts 58. These are adapted to register with the openings 40 in the plate 12.

The sine bar of FIGS. 6 and 7 includes a series of dowel pin openings 60 located on a circle 62. These receive a dowel pin 64, which extends through the base plate 56 so that it can be engaged by a locating gauge block (not shown). One side of the gauge block would engage a plate 66, which may be bolted to a locating surface 68 formed on the plate 12 for the base structure.

By appropriately gauging the distance of the dowel pin 64 with respect to the plate 66, the angle of the sine bar plate 56 with respect to the base plate 12 can be controlled. After the proper relative angular disposition is obtained, the plate 56 of the sine bar assembly can be clamped to the plate 12 of the base by the clamping bolts 58. These are received, as mentioned earlier, through the arcuate slots 57.

The sine bar assembly includes a pair of track supports 70 and 72. These are situated on opposite sides of the sine bar plate opening 54. Each of them is formed with a pair of locating surfaces identified by reference characters 74 and 76. The support 70 carreis a V-groove trackway 78 and the support 72 carries a V-groove trackway 80.

Bushing 82 is received within the opening 38 to form a zero-tolerance piloting action with respect to the pilot pin 52. A table is identified by reference character 84. It includes a base plate 86, as best seen in FIG. 10, and four trackways 88, 90, 92 and 94 carried at the underside of the plate 86. Trackway 88 is formed with a V-groove which registers with the trackway support 14 carried by the base. Friction-free steel balls 96 are received in the V-groove trackways to support one corner of the table 84. The trackway 90 has a V-groove that registers with the V-groove in the trackway 32. Friction-free balls 98 are situated between these V-grooves, thereby supporting another corner of the table.

The corners of the table opposite the V-groove trackways 88 and 90 are supported by friction-free balls that register with the V-grooves in the trackways 92 and 94. These balls ride on the flat trackway surfaces of the cooperating base trackways, one of which is shown at 34 in FIG. 5.

The center section of the table is formed with an elongated opening 100 through which a zero-tolerance bearing assembly 102 extends. This bearing assembly forms a part of the cross slide for the sine bar, and it will be explained infra.

The upper surface of the table carries a V-groove trackway 104 which is situated in parallel disposition with respect to a second V-groove trackway 106 carried by the plate 86. Trackway 106 is secured to the plate 86 by bolts 108.

A V-groove trackway 110 registers with the trackway 104. Friction-free steel ball bearings 112 are situated in the cooperating V-grooves in trackways 104 and 110. In a similar fashion V-groove trackway 114 registers with the V-groove trackway 106. Steel ball bearings 116 are situated in the registering V-grooves of the trackways 114 and 106.

The sine bar cross slide includes a body 120 to which the trackways 110 and 114 are secured, suitable bolts 122 being provided for this purpose. An adjusting screw 124 is provided, as indicated in FIG. 1, to produce a zero-tolerance condition in the trackways. After the proper adjusted position of the trackways 110 with respect to the trackway 104, is achieved, trackway 110 can be bolted securely to the body 120 by the clamping bolts 122. Compensation for skewing and for spacing variations of one trackway with respect to the other can be obtained in this fashion.

A corresponding adjusting screw 126 is provided for the V-groove trackway 106. It may be operated in the same way that the adjusting screw 124 is operated. Adjusting screw 126 is carried by a bar support 128, which in turn is secured to the plate 86 of the table. A corresponding bar support 130 is situated on the opposite side of the axis of the bearing assembly 122.

The sine bar slide is best seen in FIGS. 8 and 9. It includes a pair of V-groove trackways 132 and 134 which register with the V-groove trackways 70 and 72 shown in FIG. 6 and in FIG. 7. These are carried by a central slide plate 136. In the center of the slide plate is secured a pilot pin 138. Friction-free ball bearings 140 register with the V-grooves in the trackways 78 and 132. A second series of ball bearings 142 registers with the V-grooves in the trackways 80 and 134, thereby providing a sliding connection between the plate 136 and the sine bar plate 86.

A retainer cone for the zero-tolerance bearing assembly 102 is shown in FIG. 13. It includes a ring 144 which is bolted to a supporting surface 146 on the slide 120. The ring 144 includes a tapered bushing inner surface 148, which receives therein a tapered cone bearing element 150. This element is split with radially extending slots which permit a limited degree of radial displacement as the ring 144 is clamped to the cross slide 120 by clamping bolts 152.

The retanier ring 144 includes a pilot shoulder 154 which is received within a central pilot opening 156 formed in the cross slide.

A wave spring washer 158 is situated between the cone 150 and an anchor ring secured within the pilot opening 156 by means of a snap ring 160 as indicated.

The force exerted on the cone 150 in an axial direction with respect to the axis of the pin 138 provides a zero-tolerance bearing connection between the cross slide 120 and the sine bar cross slide 136.

Housing 162 is supported by the table 84. It includes a first end wall 164 and a second end wall 166. The base of the housing 162 includes flanges 168 and 170 which are secured by bolts to the supports 128 and 130, respectively. A bearing sleeve 172 is received within the opening 174 in the wall 166. A corresponding bearing retainer ring 176 is received within opening 178 in the wall 164.

Tapered roller bearings 180 and 182 are received within bearing rings 172 and 176, respectively. These ends support a cross shaft 184. Surrounding the shaft 184 is a drum hub 186, which is formed integrally with a rotary member in the form of a drum 188. The hub 186 is journalled on the shaft 184 by means of spaced, tapered, roller bearings 190 and 192. A pre-loaded sleeve 194 is situated between the inner races of the bearings 190 and 192. The axial forces on the pre-loaded sleeve 194 are transmitted to the inner races for bearings 182 and 180 through spacers 196 and 198.

The left end of the cross shaft 184 is connected directly to the hub of an index plate as indicated at 200. The hub has secured thereto index plate disc 202 having indexing teeth 204 on its periphery.

The wall 164 is provided with an arcuately shaped slot 201 through which extends an indexing member 206. This member is connected directly to the drum 188.

A radially outward arm 208 is connected to the member 206. It carries, in turn, a spring-loaded indexing pawl 210 having a plunger 212 which is adapted to register with the teeth 204. The plunger 212 can be withdrawn under spring pressure by a personally operable trigger 214. The angular position of the drum 188 with respect to the shaft 184 thus can be controlled.

A seal 216 is situated between wall 164 and the left hand end of the drum 188 and a corresponding seal 218 is situated between the wall 162 and the right hand end of the drum 188.

The table cross slide carries a pair of vertical supports in the form of end walls 220 and 222. A second cross shaft 224 is end supported by walls 220 and 222. One end of the shaft 224 is seated within opening 226 in wall 220 and the opposite end of the shaft 224 is received within opening 228 in the wall 222. An idler drum 230 is journalled on the cross shaft 224 by means of spaced ball bearings 232 and 234. A preloaded sleeve 236 surrounds the shaft 224 and engages the inner races of the bearings 232 and 234.

Two pairs of bands are trained over the drive drum 188 and the idler drum 230. As indicated best in FIG. 2 and 3, one pair of bands is shown at 238 and 240 and a companion set of bands is shown at 242 and 244. Bands 238 and 240 are anchored to the upper region of the drum 188, as shown at 246 and 248, respectively. Similarly, bands 242 and 244 are anchored to the drum 188 at 250 and 252, respectively. The other ends of the bands 238 and 240 are connected to cross bar 254, which in turn is secured by bolts 256 to an adjusting bolt 258. This bolt extends through an opening 260 in the adjacent wall for the housing 162. The tension on the bolt 258 may be controlled by an adjusting cam 262 through which the bolt 258 extends. Cam 262 can be adjusted from the exterior of the housing 162 by an adjusting screw 264.

The ends of the other pair of bands 242 and 244 are anchored in a manner similar to that of the anchoring assembly of which bolts 258 is a part, although that anchoring assembly is located in the opposite wall of the housing 162.

Figure 2:
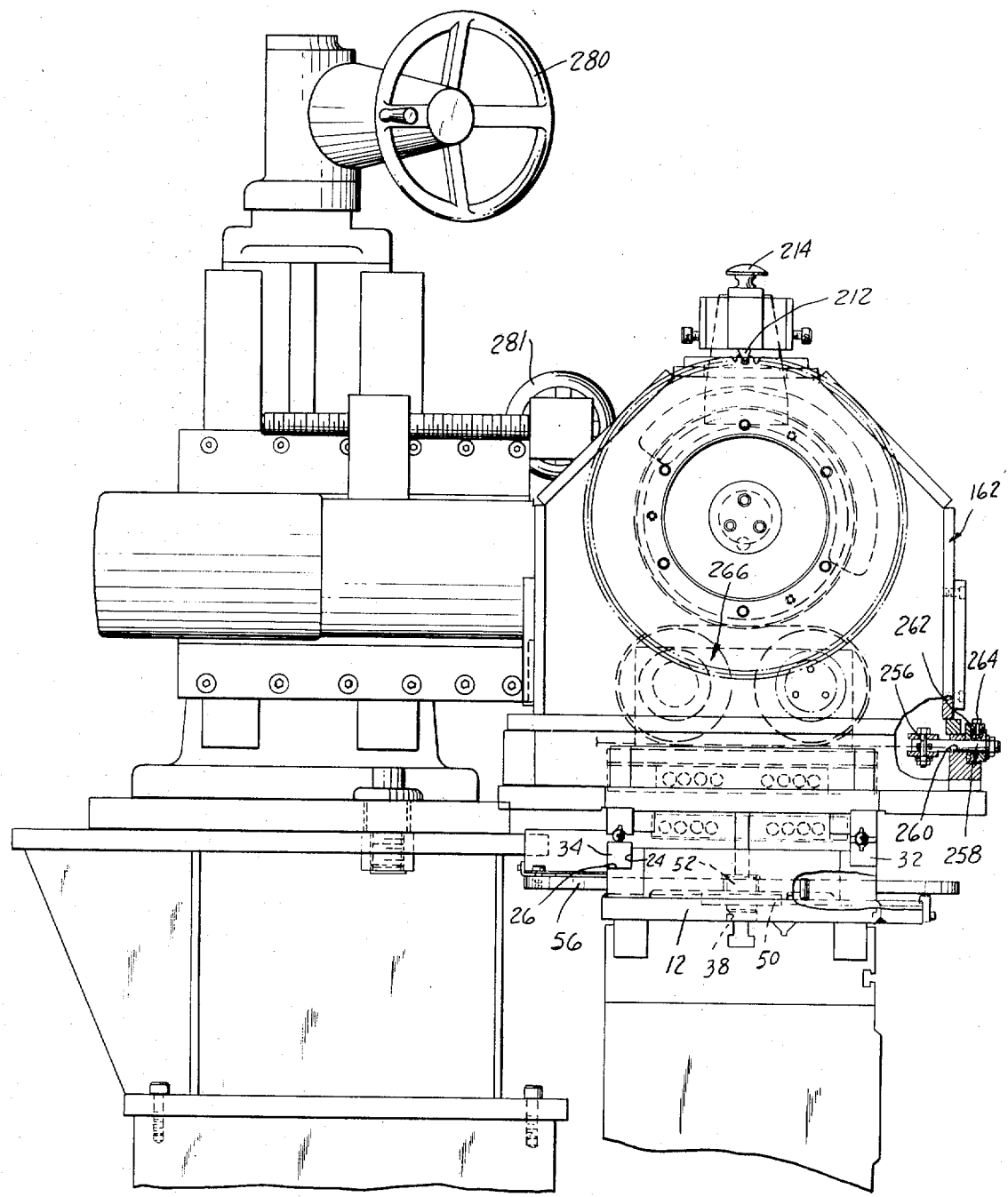
FIG. 2 is an end view, partly in section, of the gear grinding fixture of FIG. 1.

As best seen in FIG. 2, a second idler drum assembly 266 is situated adjacent the idler drum 230. Assembly 266 is identical in construction to the idler drum 230. The bands 238 and 240 are wrapped around the idler drum assembly 266 in a clockwise fashion, and they are wrapped around the driving drum 188 in a counterclockwise fashion. The bands 242 and 244, on the other hand, are wrapped around the idler drum 230 in a counterclockwise direction and are wrapped around the drive drum 188 in a clockwise direction. Thus the drum 188 is driven in either a clockwise direction or a counterclockwise direction depending upon the direction of motion of the cross slide 120 with respect to the table.

The right hand end of the assembly shown in FIG. 1 is adapted to carry a gear blank. The hub of the gear blank can be bolted or otherwise secured to the right hand end of the shaft 184. This shaft is connected drivably to the drum 188 through an indexing wheel shown in part at 202. The gear blank can be grounded by an internal gear grinding wheel 270, which is driven by a drive belt 272 and a driving pulley 274 carried by a cross slide assembly 276. This in turn is mounted on column 278 which is supported by base structure 10.

A suitable hand wheel 280 is connected by an adjusting worm and gear assembly to the cross slide 276 so that the grinding wheel 270 can be adjusted into the gear blank in a radial direction. Transverse adjustments can be obtained by a companion hand wheel 281 as shown in the drawings.

The gear blank carried by the shaft 184 is advanced in the direction of the axis of the shaft 184 as the table 84 is adjusted relative to the base. As this translation takes place, the drum and the workpiece to which it is connected are rotated about the axis of the shaft 184. Rotation of the drum 230 about its axis occurs as the cross slide 120 moves relative to the table 84.

The cross slide 120 is adjusted by the pin 138. This in turn is carried by the cross slide for the sine bar shown at 136. This latter adjustment is accomplished by a fluid servo motor comprising a piston and cylinder assembly which is situated between a reaction element 282 carried by the cross slide 136 and a reaction element carried by a sine bar plate 56. The servo motor can be in the form of a double acting piston, and movement in one direction or the other can be achieved by controlling the pressure distribution to either one side of the piston or the other.

It is possible with this structure to achieve any form of compound motion for the gear blank during the grinding operation regardless of the angularity of the helical teeth. Two adjustments are made for any given gear grinding operation. That is, the angularity of the sine bar plate 56 with respect to the base 10 can be controlled by a gauge block and secured in a fixed position by the clamping bolts 58. Secondly, the index wheel 202 can be adjusted as each grinding operation is repeated for the various helical teeth. After one grinding operation is completed, the wheel is indexed to the next tooth.

Linear motion of the slide 136 with respect to the sine bar plate 56, which is accomplished by the fluid motor, results in translation of the table 86 with respect to the base. The amount of the translation for any given displacement of the motor, however, depends upon the angular position of the sine bar plate 56 that is selected by the operator. The translation of the slide 120 with respect to the table which occurs as the slide 136 is adjusted relative to the sine bar results in rotary motion of the drum. Thus the sine bar effects both translation and rotary motion of the drum, and this compound motion is transferred in turn through the shaft 184 to the workpiece during the grinding steps.

The same friction-free, zero-tolerance adjustment is attained for the workpiece regardless of the magnitude of the angular setting of the sine bar with respect to the base.

Having thus described a preferred form of my invention, what I claim and desire to secure by U.S. Letters Patent is:

1. A gear forming fixture comprising a base, a sine bar cross slide, a sine bar assembly supporting said cross slide for movement in a horizontal plane in the direction of a controlled axis, means for positioning said sine bar assembly with respect to said base thereby controlling the direction of said axis, a table mounted for translation relative to said base, a table cross slide carried by said table, said table and said table cross slide having cooperating parts for translating said table and supporting said table cross slide for reciprocating movement relative to said table, said translation of said table being in response to said reciprocating movement, means on said sine bar cross slide, connecting with and driving said table cross slide, a rotary member supported by said table, means on said table cross slide connecting with and driving said rotary member, a cross shaft connected to said rotary member, means for driving said since bar cross slide, and means for mounting a gear blank on said cross shaft, said gear blank being rotated about its axis and adjusted in the direction of its axis upon movement of said sine bar cross slide relative to said sine bar assembly whereby said workpiece may be advanced and rotated into a gear tooth forming element.

2. The combination as set forth in claim 1, wherein said means for connecting said rotary member to said table cross slide comprises a driving band anchored at one end of said table, a drum supported by said table cross slide, said band encircling said drum in one direction and encircling said rotary member in the opposite direction, the other end of said band being secured to said rotary member, a second driving band anchored on one end thereof to said table and encircling said drum in said opposite direction and encircling said rotary member in said one direction, the other end of said second band also being connected to said rotary member.

3. The combination as set forth in claim 1, wherein said base has a trackway and said table has a cooperating trackway, and frictionless roller elements situated between said trackways whereby said table can be adjusted in translation relative to said base.

4. The combination as set forth in claim 2, wherein said base has a trackway and said table has a cooperating trackway, and frictionless roller elements situated between said trackways whereby said table can be adjusted in translation relative to said base.

5. The combination as set forth in claim 3, wherein said sine bar assembly comprises an adjustable plate mounted on said base for angular controlled adjustment about a central axis, a pair of trackways supported by said plate, a pair of cooperating sine bar trackways carried by said sine bar cross slide, friction-free roller elements situated between the trackways of said sine bar plate and said sine bar cross slide, a driving pin carried by said sine bar cross slide registering with the cross slide for said table whereby translatory movement of said sine bar cross slide effects translatory movement of said table cross slide with respect to said table.

6. The combination as set forth in claim 4, wherein said sine bar assembly comprises an adjustable plate mounted on said base for angular controlled adjustment about a central axis, a pair of trackways supported by said plate, a pair of cooperating sine bar trackways carried by said sine bar cross slide, friction-free roller elements situated between the trackways of said sine bar plate and said sine bar cross slide, a driving pin carried by said sine bar cross slide registering with the cross slide for said table whereby translatory movement of said sine bar cross slide effects translatory movement of said table cross slide with respect to said table.

7. The combination as set forth in claim 3, wherein said table supports a pair of table trackways, said table cross slide having a pair of trackways that register with said table trackways, friction-free roller elements situated between said last mentioned trackways whereby said table cross slide can be adjusted with a transitory motion relative to said table as said sine bar cross slide is adjusted relative to said sine bar plate.

8. The combination as set forth in claim 4, wherein said table supports a pair of table trackways, said table cross slide having a pair of trackways that register with said table trackways, friction-free roller elements situated between said last mentioned trackways whereby said drum can be adjusted with a transitory motion relative to said table as said sine bar cross slide is adjusted relative to said sine bar plate.

9. The combination as set forth in claim 5, wherein said table supports a pair of table trackways, said table cross slide having a pair of trackways that register with said table trackways, friction-free roller elements situated between said last mentioned trackways whereby said table cross slide can be adjusted with a transitory motion relative to said table as said sine bar cross slide is adjusted relative to said sine bar plate.

10. The combination as set forth in claim 6, wherein said table supports a pair of table trackways, said table cross slide having a pair of trackways that register with said table trackways, friction-free roller elements situated between said last mentioned trackways whereby said drum can be adjusted with a transitory motion relative to said table as said sine bar cross slide is adjusted relative to said sine bar plate.

11. The combination as set forth in claim 7, wherein the connection between said cross shaft and said rotary member includes an index wheel connected to said cross shaft and an index pawl connected to said rotary member, said pawl and said index wheel having registering parts which lock one to the other at predetermined relative angular positions whereby said workpiece can be indexed from one tooth position to the other as gear forming operations are repeated for each of the teeth.

12. The combination as set forth in claim 8, wherein the connection between said cross shaft and said rotary member includes an index wheel connected to said cross shaft and an index pawl wheel connected to said rotary member, said pawl and said index wheel having registering parts which lock one to the other at predetermined relative angular positions whereby said workpiece can be indexed from one tooth position to the other as gear forming operations are repeated for each of the teeth.

13. The combination as set forth in claim 9, wherein the connection between said cross shaft and said rotary member includes an index wheel connected to said cross shaft and an index pawl wheel connected to said rotary member, said pawl and said index wheel having registering parts which lock one to the other at predetermined relative angular positions whereby said workpiece can be indexed from one tooth position to the other as gear forming operations are repeated for each of the teeth.

14. The combination as set forth in claim 10, wherein the connection between said cross shaft and said rotary member includes an index wheel connected to said cross shaft and an index pawl wheel connected to said rotary member, said pawl and said index wheel having registering parts which lock one to the other at predetermined relative angular positions whereby said workpiece can be indexed from one tooth position to the other as gear forming operations are repeated for each of the teeth.

References Cited

UNITED STATES PATENTS

| | | | |
|---|---|---|---|
| 1,942,416 | 6/1934 | Fellows | 51—95 |
| 2,258,510 | 10/1941 | Laessker | 51—95 |
| 1,870,764 | 8/1932 | Aeppli | 51—123 |

HAROLD D. WHITEHEAD, Primary Examiner